(12) United States Patent
Mielke et al.

(10) Patent No.: US 6,490,440 B1
(45) Date of Patent: Dec. 3, 2002

(54) DIGITAL TRANSMITTER CIRCUIT AND METHOD OF OPERATION

(75) Inventors: James S. Mielke, Phoenix, AZ (US); Albert H. Higashi, Lawrenceville, GA (US); Serge Drogi, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/323,236

(22) Filed: Jun. 1, 1999

(51) Int. Cl.[7] .................................................. H04B 1/02
(52) U.S. Cl. ........................ 455/102; 455/118; 455/127; 375/300
(58) Field of Search ................................ 455/102, 108, 455/112, 118, 127, 91, 73, 552, 553; 375/300, 298, 296, 295; 330/129, 134

(56) References Cited

U.S. PATENT DOCUMENTS

| | | |
|---|---|---|
| 5,055,802 A | 10/1991 | Hietala et al. |
| 5,070,310 A | 12/1991 | Hietala et al. |
| 6,101,224 A * | 8/2000 | Lindoff et al. ............... 455/102 |
| 6,101,225 A * | 8/2000 | Thorson ....................... 275/296 |
| 6,259,318 B1 * | 7/2001 | Mielke et al. ............... 455/127 |

\* cited by examiner

*Primary Examiner*—Lester G. Kincaid

(57) ABSTRACT

A transceiver (10) includes a transmitter (16) that receives a digital data stream from a digital signal processor (18) to delay lines (20, 30). The delay lines (20, 30) provide an address to a ROM look-up table (40). Another input of the look-up table (40) receives a signal that selects protocols such as TDMA, CDMA, and GSM. A multi-accumulator fractional-N synthesizer (48) receives phase derivative coefficients and a DAC (46) receives amplitude modulation coefficients from the look-up table (40) based on the selected protocol. The analog output signals from the DAC (46) and the synthesizer (48) are received by a variable gain amplifier (54) that generates an RF amplitude and frequency modulated output signal for transmission from the transmitter (16).

15 Claims, 2 Drawing Sheets

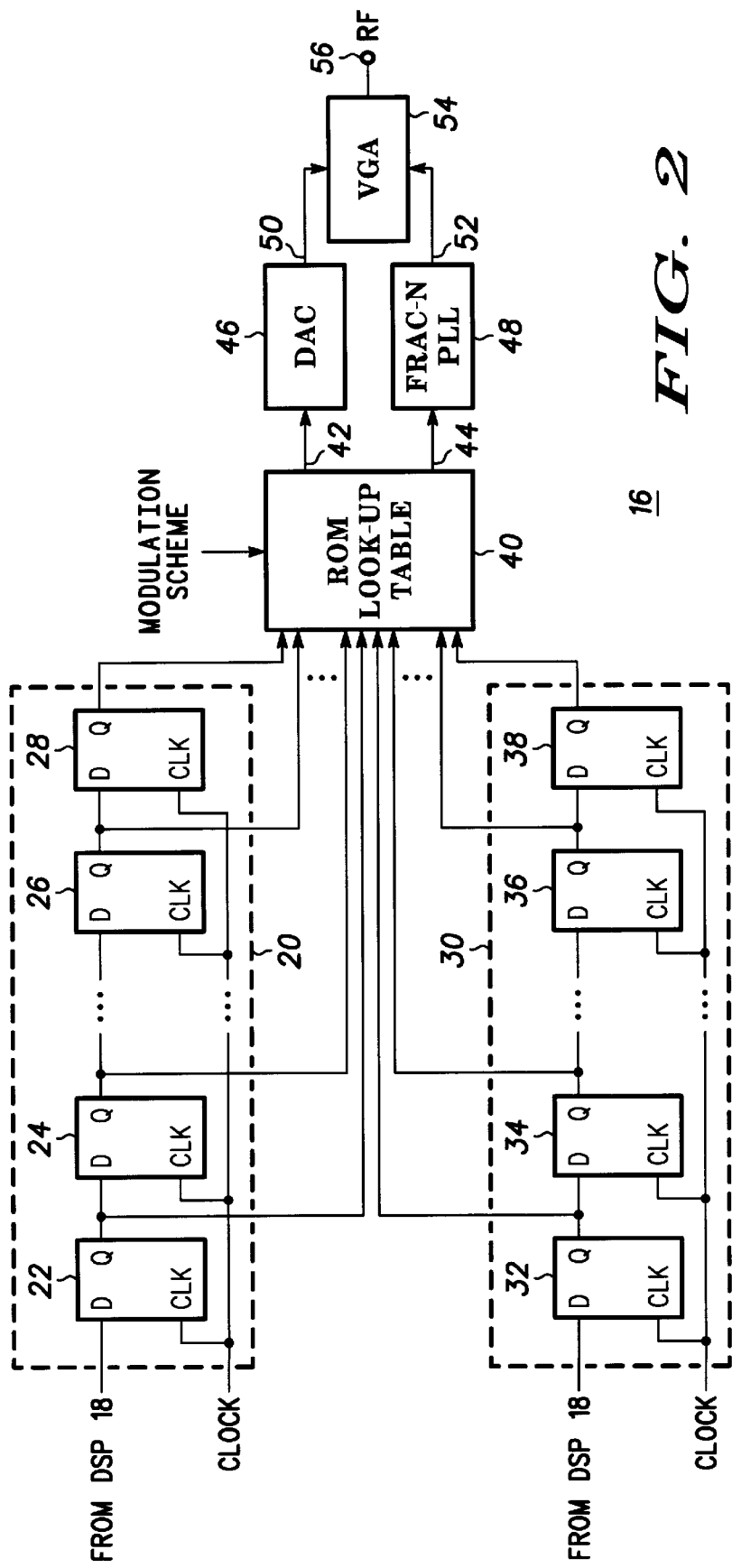

DIGITAL TRANSMITTER CIRCUIT AND METHOD OF OPERATION

BACKGROUND OF THE INVENTION

The present invention relates, in general, to digital transceivers and, more particularly, to a digital transmitter using a fractional-N frequency synthesizer.

Phase-Locked Loop (PLL) frequency synthesis is a well known technique for generating one of many related signals from a Voltage Controlled Oscillator (VCO). In a PLL, an output signal from the VCO is coupled to a programmable frequency divider which divides by a selected integer number. A phase detector compares the frequency divided signal to a reference signal and any difference in phase between the frequency divided signal and the reference signal is output from the phase detector, coupled through a loop filter, and applied to the VCO. The VCO provides an output signal that changes in frequency such that the phase error between the frequency divided signal and the reference signal is minimized.

In order to overcome the limitations of the output frequency step size being constrained to be equal to the reference signal frequency, a fractional-N synthesizer having programmable frequency dividers capable of dividing by non-integers has been developed. Output frequency step sizes which are fractions of the reference signal frequency are obtained while maintaining a high reference frequency and wide loop bandwidth. A transmitter that includes a fractional-N synthesizer has been used to provide a phase modulation signal for Global System for Mobil communications (GSM). However, other communications protocols such as Time Division Multiple Access (TDMA) and Code Division Multiple Access (CDMA) require amplitude modulation in addition to the phase modulation.

Hence, a need exists for a transmitter capable of operating over a wide frequency band, while providing an RF modulated output signal having both amplitude modulation and phase modulation.

BRIEF DESCRIPTION OF THE DRAWINGS

FIG. 2 is a block diagram of a portion of the transmitter as illustrated in FIG. 1;

DETAILED DESCRIPTION OF THE DRAWINGS

Figure 1:
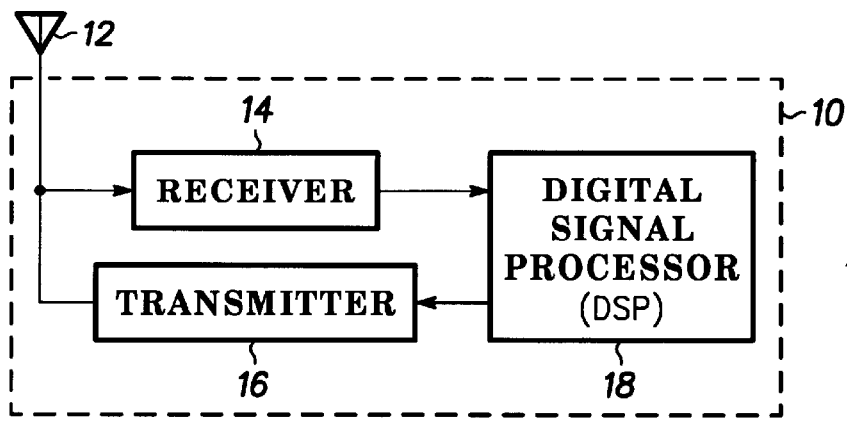
FIG. 1 is a block diagram of a transceiver circuit.

FIG. 1 is a block diagram of a transceiver circuit 10. Transceiver circuits are used in wireless communication applications such as cordless telephones, cellular telephones, and land mobile telephones. The receiver portion 14 of transceiver circuit 10 typically receives a Radio Frequency (RF) modulated signal from an antenna 12. The RF signals received from antenna 12 are typically buffered by an input low-noise amplifier before being sent to a filter and a mixer (not shown). The mixer uses a local oscillator signal for downconverting the RF signal to an Intermediate Frequency (IF) signal that is converted to a digital signal that is transferred to a Digital Signal Processor (DSP) 18 for additional processing. A digital output signal from DSP 18 is transferred to a transmitter 16. The digital output signal is amplitude and frequency modulated and the RF signal is then transmitted from antenna 12.

FIG. 2 is a block diagram of a portion of transmitter 16 as illustrated in FIG. 1. Transmitter 16 receives a first digital data signal from DSP 18 that is time delayed by shifting the data signal through a shift register or delay line 20. Delay line 20 includes D-latches 22, 24, 26, and 28, each having a data input D, a clock input CLK, and an output Q. The D-latches in delay line 20 have commonly connected clock inputs that receive the clock signal CLOCK. The data input of D-latch 22 is connected to the output of DSP 18 for receiving digital data in a serial data stream. The output of D-latch 22 is connected to the data input of D-latch 24. The output of D-latch 24 is coupled through an additional number of D-latches (not shown) to a data input of D-latch 26. The output of D-latch 26 is connected to the data input of D-latch 28.

Transmitter 16 further receives a second digital data signal from DSP 18 that is time delayed by shifting the data signal through a shift register or delay line 30. Delay line 30 includes D-latches 32, 34, 36, and 38, each having a data input D, a clock input CLK, and an output Q. The D-latches in delay line 30 also have commonly connected clock inputs that receive the clock signal CLOCK. The data input of D-latch 32 is connected to the output of DSP 18 for receiving digital data in a serial data stream. The output of D-latch 32 is connected to the data input of D-latch 34. The output of D-latch 34 is coupled through an additional number of D-latches (not shown) to a data input of D-latch 36. The output of D-latch 36 is connected to the data input of D-latch 38.

The outputs of D-latches 22, 24, . . . , 26, and 28, and the outputs of D-latches 32, 34, . . . , 36, and 38 are connected to inputs of a Read Only Memory (ROM) look-up table 40. In the preferred embodiment, look-up table 40 is a Read Only Memory (ROM), but other types of memory such as Random Access Memory (RAM), Programmable Read Only Memory (PROM), data latches in a register array, or the like, could be used for storing the data coefficients. A Digital-to-Analog Converter (DAC) has an input terminal connected to output terminal 42 of ROM look-up table 40. A FRAC-N PLL 48 has an input terminal connected to output terminal 44 of ROM look-up table 40. A Variable Gain Amplifier (VGA) 54 has a first terminal connected to an output terminal 50 of DAC 46 and a second terminal connected to an output terminal 52 of FRAC-N PLL 48. An output signal from VGA 54 is supplied at terminal 56.

Alternatively, the function provided by delay lines 20 and 30 and ROM look-up table 40 could be implemented by a state machine. In yet another embodiment, the hardware of delay lines 20 and 30, and ROM look-up table 40 could be replaced by software processes performed within DSP 18. DSP 18 would receive an input that selects the modulation scheme and use internal memory to provide the amplitude modulation coefficients at terminal 42 and the phase derivative coefficients at terminal 44.

Figure 3:
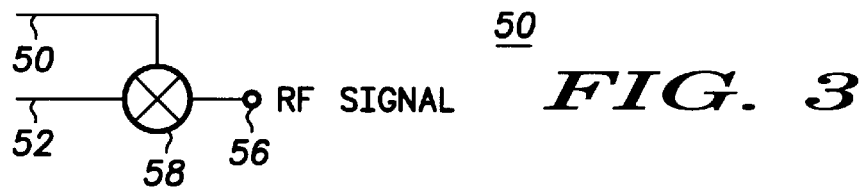
FIG. 3 illustrates one embodiment of a variable gain amplifier as shown in FIG. 2.

FIG. 3 illustrates one embodiment of VGA 54 as shown in FIG. 2. In this embodiment, an RF mixer 58 receives an input analog signal from DAC 46 and another input analog signal from FRAC-N PLL 48. It should be noted that RF mixer 58 can be configured for receiving either single ended or differential signals. The analog signal supplied at terminal 50 by DAC 46 contains amplitude information that is combined within RF mixer 58 with the analog signal supplied at terminal 52 by FRAC-N PLL that contains frequency information. Therefore, the signal generated by RF mixer 58 at terminal 56 has both Amplitude Modulation (AM) and Frequency Modulation (FM). The AM/FM signal is transmitted from antenna 12 (see FIG. 1) by transmitter 16.

Figure 4:
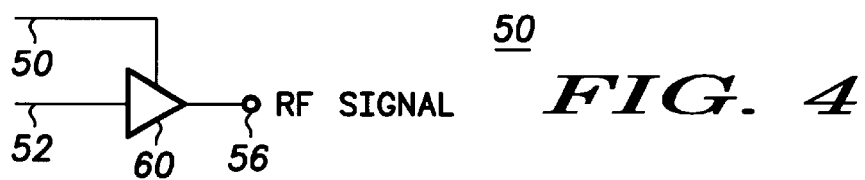
FIG. 4 illustrates another embodiment of the variable gain amplifier.

FIG. 4 illustrates another embodiment of VGA 54 for generating the AM/FM modulated output signal. In this embodiment, a buffer 60 has an input coupled for receiving the analog signal containing frequency information that is supplied at terminal 52 by FRAC-N PLL. The operating voltage of buffer 60 is changed by the analog signal containing the amplitude information that is supplied at terminal 50 by DAC 46. Thus, the signal generated by buffer 60 at terminal 56 has both amplitude and frequency modulation. Although buffer 60 is shown as a non-inverting buffer, it should be noted that buffer 60 can be an inverting buffer.

In operation, referring to FIG. 1, the present invention is suitable for wireless communication applications using protocols that operate at different frequencies. By way of example, receiver 14 and transmitter 16 respectively receive and transmit signals having frequencies of about 900 MegaHertz (MHz) for cordless telephones, or frequencies ranging from about 900 MHz to 1800 MHz for cellular telephones, or frequencies of about 150 MHz, 300 MHz, 450 MHz, etc., for land mobile telephones, or frequencies of about 2.4 GigaHertz (GHz) for wire data such as email.

Referring to FIGS. 1 and 2, a serial data stream that is to be transmitted is transferred from DSP 18 to transmitter 16 and shifted through delay lines 20 and 30 by the signal CLOCK. The data stored in the latches of delay lines 20 and 30 provides the address values for ROM look-up table 40. In addition to the address values, ROM look-up table 40 further receives a signal at the MODULATION SCHEME terminal that selects a user defined protocol such as Time Division Multiple Access (TDMA), Code Division Multiple Access (CDMA), and Global System for Mobil communications (GSM). In accordance with the present invention, ROM look-up table 40 stores phase derivative coefficients and amplitude modulation coefficients for the user selected protocols. It should be noted that only the phase derivative coefficients are supplied by ROM look-up table 40 when the GSM protocol is selected.

For a selected protocol, ROM look-up table 40 supplies multiple phase derivative coefficients to FRAC-N PLL 48 at terminal 44 and multiple amplitude modulation coefficients at terminal 42 to DAC 46 for each address provided by delay lines 20 and 30. Thus, multiple sets of phase and amplitude coefficients are generated by ROM look-up table 40 for each address supplied from delay lines 20 and 30. ROM look-up table 40 provides phase derivative coefficients and amplitude modulation coefficients based on the current address and a prior history as provided by the previous address. In other words, a first set of phase and amplitude coefficients are generated by ROM look-up table 40, followed by a second set of phase and amplitude coefficients, etc., with each set of coefficients having values that are based on the current address in relation to the previous address. The number of sets of coefficients generated between changes in address, as caused by the signal CLOCK to delay lines 20 and 30, is dependent upon the selected protocol.

To achieve rapid frequency changes, modulation, and low spurious signal and noise levels, a fractional-N synthesizer is employed in the present invention. FRAC-N PLL 48 is a fractional-N frequency synthesizer that uses multiple accumulators and programmable frequency dividers (not shown) for division by a non-integer. For modulation, FRAC-N PLL 48 employs ROM look-up table 40 to convert the data stream that is to be transmitted, as supplied from DSP 18, into frequency offsets for the fractional-N synthesizer. The loop division of the synthesizer is adjusted in accordance with the phase derivative coefficients received at terminal 44 that follow the instantaneous frequency offset required for the phase modulated signal. The overall effect of FRAC-N PLL 48 is to integrate the differential phase and to provide a constant envelope RF phase-modulated signal. The phase-modulated signal, with modulation based on the selected protocol, is provided at the output of FRAC-N PLL 48.

In addition, the amplitude modulation coefficients supplied from ROM look-up table 40 are transferred to DAC 46 for conversion to an analog signal that is representative of the amplitude modulation coefficient. In one embodiment, the analog signal generated by DAC 46 containing amplitude information is transferred to RF mixer 58 (see FIG. 3) along with another analog signal from FRAC-N PLL 48 containing phase information. RF mixer 58 mixes the two analog signals and generates a signal at terminal 56 having both amplitude and frequency modulation.

In a second embodiment, the analog signal generated by FRAC-N PLL 48 contains phase information that is transferred to the gate terminal of buffer 60 (see FIG. 4). The analog signal generated by DAC 46 contains amplitude information that is transferred to the operating power supply of buffer 60. Buffer 60 combines the two analog signals and generates a signal at terminal 56 having both amplitude and frequency modulation. For either embodiment, the AM/FM modulated signal is transmitted from antenna 12 (see FIG. 1) by transmitter 16.

By now it should be appreciated that a transmitter using a fractional-N synthesizer and a look-up table to provide both amplitude and phase coefficients has been provided. The amplitude coefficients are converted by a DAC from a digital signal to an analog signal. A variable gain amplifier combines the amplitude modulated signal from the DAC with the frequency modulated signal from the fractional-N synthesizer. The transmitter accommodates various communications protocols over a wide band of frequency operation and transmits an RF output signal having both amplitude and frequency modulation.

What is claimed is:

1. A transmitter, comprising:
   a digital-to-analog converter (DAC) having an input that receives first data values and provides an amplitude modulated signal;
   a synthesizer that integrates second data values received at an input and provides a phase modulated signal;
   an amplifier coupled for receiving the amplitude modulated signal and the phase modulated signal and having an output that supplies an amplitude and frequency modulated signal; and
   a memory having a first input coupled for receiving an address, a second input coupled for receiving a modulation scheme, a first output coupled to the input of the DAC, and a second output coupled to the input of the synthesizer.

2. The transmitter of claim 1, wherein the synthesizer is a fractional-N synthesizer.

3. The transmitter of claim 1, further comprising a delay line having an input coupled for receiving a data bit and an output coupled to the first input of the memory.

4. The transmitter of claim 1, wherein the amplifier includes a mixer having a first input coupled for receiving the amplitude modulated signal, a second input coupled for receiving the phase modulated signal, and an output that supplies the amplitude and frequency modulated signal.

5. The transmitter of claim 1, wherein the amplifier includes a buffer having an input coupled for receiving the phase modulated signal, a power input coupled for receiving the amplitude modulated signal, and an output that supplies the amplitude and frequency modulated signal.

6. A transceiver circuit having a terminal coupled for receiving a Radio Frequency (RF) signal, comprising:
- a receiver having an input coupled for receiving the RF signal;
- a processor having an input coupled to an output of the receiver; and
- a transmitter having an input coupled to an output of the processor, wherein the transmitter further comprises,
  - a digital-to-analog converter (DAC) having an input that receives first data values from the processor and provides an amplitude modulated signal,
  - a synthesizer that integrates second data values received from the processor and provides a phase modulated signal;
  - an amplifier coupled for receiving the amplitude modulated signal and the phase modulated signal and having an output that supplies an amplitude and frequency modulated signal; and
  - a memory having a first input coupled for receiving an address, a second input coupled for receiving a modulation scheme, a first output coupled to the input of the DAC, and a second output coupled to the input of the synthesizer.

7. The transceiver circuit of claim 6, wherein the synthesizer is a fractional-N synthesizer.

8. The transceiver circuit of claim 6, wherein the first and second data values are based on the modulation scheme.

9. The transceiver circuit of claim 8, wherein the modulation scheme is selected from a group of Time Division Multiple Access (TDMA), Code Division Multiple Access (CDMA), and Global System for Mobil communications (GSM).

10. The transceiver circuit of claim 6, wherein the amplifier includes a mixer having a first input coupled for receiving the amplitude modulated signal, a second input coupled for receiving the phase modulated signal, and an output that generates the amplitude and frequency modulated signal.

11. The transceiver circuit of claim 6, wherein the amplifier includes a buffer having an input coupled for receiving the phase modulated signal, a power input coupled for receiving the amplitude modulated signal, and an output that supplies the amplitude and frequency modulated signal.

12. A method of generating a phase and amplitude modulated signal from a digital signal, comprising the steps of:
- generating amplitude modulation coefficients from the digital signal;
- converting the amplitude modulation coefficients to an analog value that is representative of the amplitude modulation coefficients;
- generating phase derivative values from the digital signal;
- integrating the phase derivative values in generating a phase modulated signal; and
- combining the analog value and the phase modulated signal to generate the phase and amplitude modulated signal.

13. A method of generating a phase and amplitude modulated signal from a digital signal, comprising the steps of:
- generating amplitude modulation coefficients from the digital signal;
- converting the amplitude modulation coefficients to an analog value that is representative of the amplitude modulation coefficients;
- generating phase derivative values from the digital signal;
- integrating the phase derivative values in generating a phase modulated signal;
- selecting a modulation scheme when generating amplitude modulation coefficients and phase derivative values; and
- combining the analog value and the phase modulated signal to generate the phase and amplitude modulated signal.

14. The method of claim 12, wherein the step of combining the analog value and the phase modulated signal further includes the steps of:
- amplifying the phase modulated signal in an amplifier; and
- using the amplitude modulated signal to provide an operating supply to the amplifier.

15. The method of claim 12, wherein the step of integrating the phase derivative values further includes the step of using a fractional-N synthesizer for integrating.

* * * * *